Patented Mar. 22, 1932

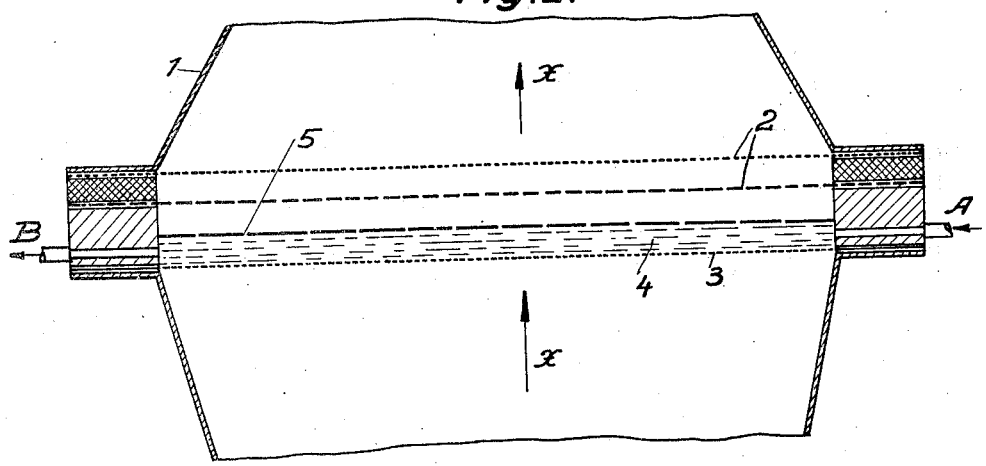
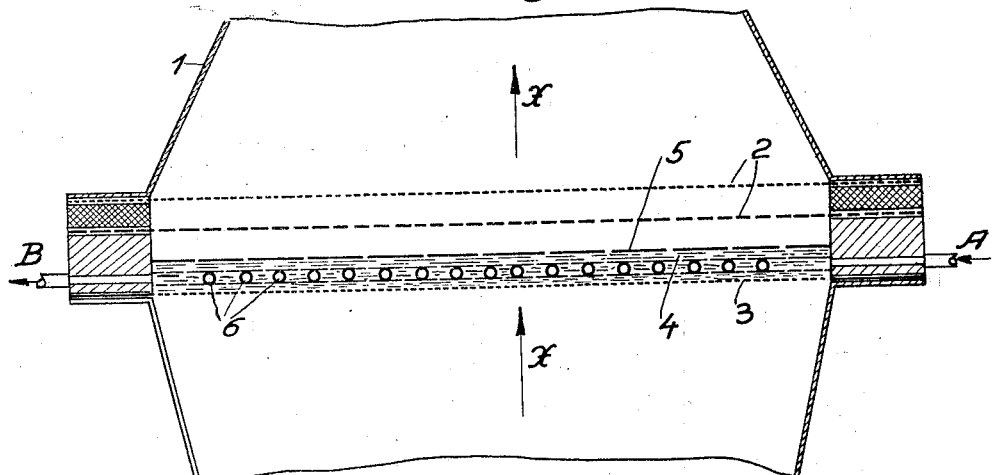

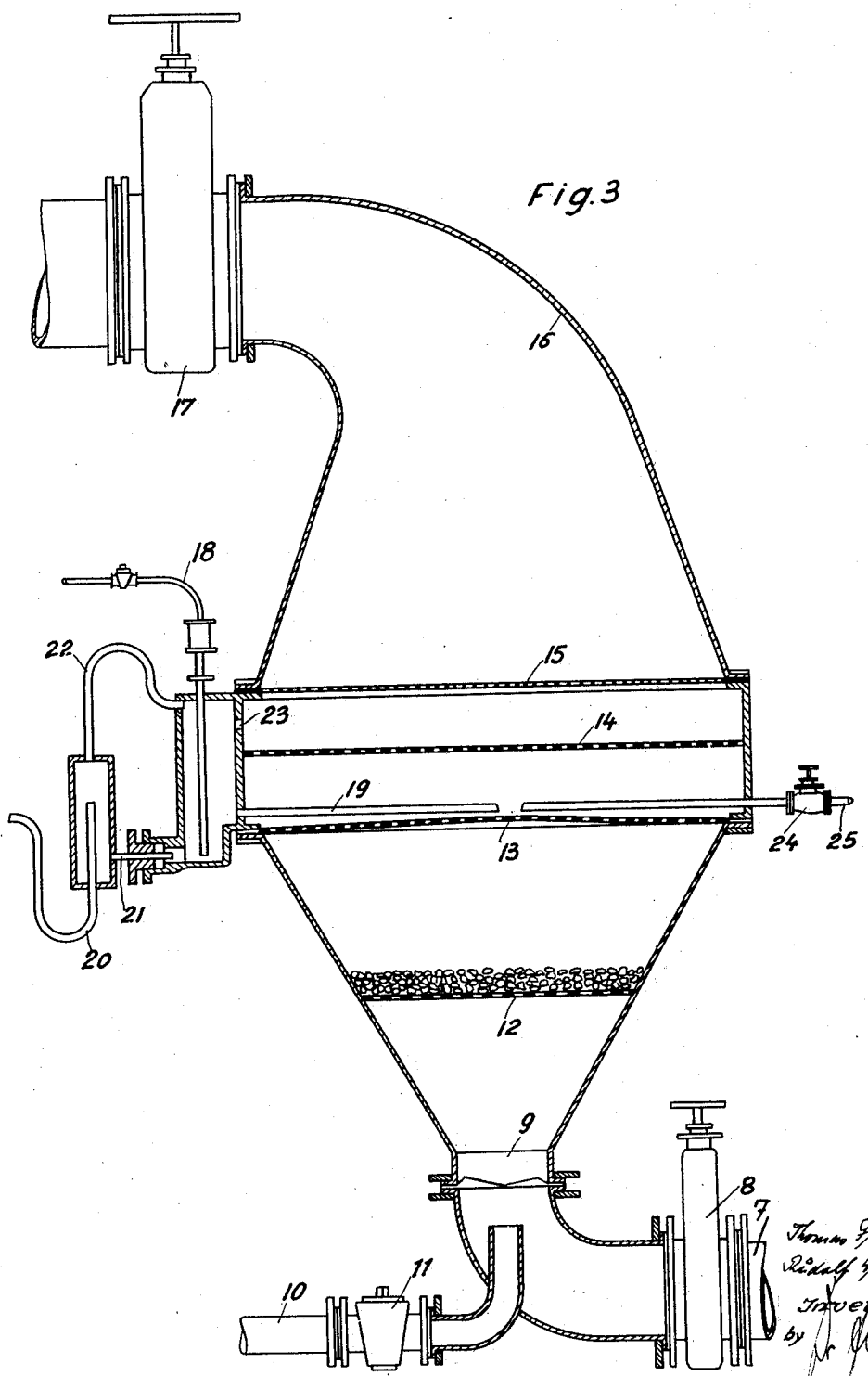

1,850,129

UNITED STATES PATENT OFFICE

THOMAS FISCHER AND RUDOLF WENDLANDT, OF PIESTERRITZ, GERMANY, ASSIGNORS TO NICODEM CARO, OF BERLIN, GERMANY, AND ALBERT R. FRANK, OF BERLIN-HALENSEE, GERMANY

METHOD OF OXIDIZING AMMONIA

Application filed June 24, 1927, Serial No. 201,266, and in Germany June 29, 1926.

With the known methods for the manufacture of nitrogen-oxygen compounds or of nitric acid from gas mixtures containing ammonia and oxygen it has up to now not been possible in practice to obtain a complete conversion of the nitrogen supplied in the form of ammonia into nitrogen-oxygen compounds. According to the proposals hitherto made the mixture of ammonia and air is either preheated by the heat of the discharging gases before conveying it to the contact, or the mixture is caused to take up heat from the contact by way of radiation. There exists, however, the danger that the ammonia will be decomposed by undue superheating. Now it has been discovered that an increase of the yield may be obtained by cooling the mixture of ammonia and air prior to being permitted to getting access to the catalyzer.

As to the variation of the concentration of the ammonia or that of the oxygen in the gas mixture it must be understood that all proposals hitherto made have failed for the reason that with an ammonia-oxygen concentration increasing above 10 vol. % of ammonia the contact temperature will be raised to an impermissible value, and reach as early as at 16 vol. % the lower limit of explosion at ordinary pressure.

The following method has proved particularly successful in order to obtain an energetic cooling. A layer of liquid is provided in the path of motion of the gas which will thus be caused to continuously pass through this layer of liquid in the form of numerous fine bubbles. There may be provided a layer of liquid extending over the whole width of the contact. In this manner no heat will pass back to the contact, neither by radiation nor by reflection, the liquid on the contrary abstracting a large part of the convection heat and of the radiated heat from the contact. The layer of liquid may be provided in the rear of or above the contact-zone, preferably, however, said layer of liquid is provided in front or below the contact. In the latter case the fresh gas will thus be caused to continuously pass through said layer of liquid in the form of numerous fine bubbles. Owing to the fact, that the gas bubbles pass incessantly through said layer, the upper surface of the latter will be permanently interrupted, and no heat will pass back to the contact by radiation nor by reflection, the said surface of the liquid, on the contrary, taking up a large part of heat. The amount of heat absorbed will now be able to produce a proper amount of water-steam, which will mix with the fresh or live-gas and increase the heat capacity of the same during passing the contact.

In this way the contact temperature may be reduced and regulated to such an extent that it will be possible to maintain with mixtures containing a high percentage of ammonia that temperature which is most favorable for the conversion. The improved method may be carried through with the aid of the device illustrated diagrammatically and by way of example in the accompanying drawings, of which Fig. 1 is an axial section through one constructional form of the device, Fig. 2 a similar representation showing another constructional form as modification, and Fig. 3 a longitudinal section through a complete combustion device according to this invention.

The ammonia-oxygen mixture passes upwards in the direction indicated by the arrows $x$ in Figs. 1 and 2 through a hollow container 1 suited to cause said mixture to undergo combustion at the platinum contact. A few cm. below the double contact net 2 which, for example, may consist of platinum or alloys of platinum is arranged a sieve or perforated sheet metal 3 which serves for supporting a layer 4 of liquid which may be supplied through a pipe A and conducted through an oppositely located pipe B. The perforations of the sieve 3 are of such size (for instance 1 mm.) that no water can pass through said perforations downwardly during upward passage of the gas. Said perforations may also be made still smaller, so that the water is retained upon the sieve merely by action of capillarity. Instead of the sieve 3 a wire-net with meshes of the proper size may be used, so that the combustion mixture will pass through the layer of water 4. If special provisions shall be made to prevent the water, when passing out of said liquid, from forming bubbles or to scum or to be squirted or the like, a further wire-net 5 having comparatively large meshes may be arranged immediately above the surface of the layer of liquid 4, which wire-net, however, does not act as contact. Instead of said wire-net 5 also a perforated sheet-metal piece may be used which is preferably so designed that it cuts the bubbles.

About 1 cm. above the layer of water there is located the contact layer which, for instance, may consist of a platinum wire-net 2. The distance between said platinum wire-net and the liquid layer, however, may also be essentially larger, for instance 20 cm. In general we wish to be understood that the sizes of the meshes as above given are intended to serve as an example, and that the size of said meshes as well as of other elements of the apparatus may be changed in accordance with other circumstances.

The radiation heat which the layer of liquid has abstracted from the contact will cause vaporization of the water over the entire sectional area with the effect, that the water is supplied continually in such an amount that its thickness upon the sieve remains practically constant or, in other words, that the amount of water which evaporates does not exceed the amount required for the regulation of the temperature. With a device as above described it is rendered possible to oxidize, for instance, a dry mixture containing as much as 20 vol. % of ammonia and even more with a conversion of about 95 to 96% with a supply of steam from the layer of only 10 vol. %. In this manner 94 to 95% of the ammonia supplied will be obtained as an acid of a specific gravity of 1.4 and more, if the process, for instance, is carried out by Linde-air containing 60% of oxygen. In this case the average output of the working element will be 25% larger and the condensation space only from 1/10 to 1/50 of that otherwise needed.

Owing to the reduction of the reaction temperature and the increase of the heat capacity of the reaction mixture any danger of explosion will be completely obviated. In the case of extraordinary troubles which may arise in connection with the operation of the apparatus, such as for instance in case of uncontrollable strong variations of the composition of the mixture, as well as of variations of the pressure, the layer of water will present a complete protection against explosion. In the very narrow zone between the upper surface of the layer of water and the contact-net, therefore, no directed explosion wave, and in particular, no detonation can arise. Also, the wave of the detonation, if arising at all, would not be able to pass the closure presented by the layer of water.

In particular cases the steam pressure of the water zone and the amount of the steam generated out of the water may be controlled by cooling or by heating.

In the modification shown in Fig. 2 a cooling or heating pipe or also a heating coil 6 is arranged within the layer of liquid. The steam-pressure of the water zone and the amount of the steam may also be affected by substances which are dissolved or distributed in the water, or if steam is added, the quantity of added steam may be changed. Instead of employing a layer of water as cooling agent, the cooling zone may also be supplied with ammonia-water, and the ammonia-gas dissolved in the water may be evaporated and a more diluted ammonia mixture or an oxygen-nitrogen mixture which is free of ammonia may be caused to pass through the ammonia water. The layer of water may also be utilized for purifying the fresh or live-gas, for instance, with the aid of suitable admixtures. Also ammonia salts may be dissolved in the liquid and $NH_3$ may be liberated either by steam or by the action of alkaline substances. There may also be used several layers of liquid, one in the rear of the other.

According to Fig. 3 the combustion air is carried through the conduit 7 into the regulating valve 8 towards the under aperture of the element 9 of the combustion apparatus. The element 9 of the combustion apparatus comprises a mixing device, the ammonia conduit 10 with the regulating valve 11 therein entering in front of said mixing device. A layer of filling bodies is provided upon the sieve 12, said layer serving for distributing, purifying and final mixing of the gas. This layer of filling bodies may also fill-up the entire hollow space of the combustion apparatus. The gas mixture will pass from below in the form of numerous bubbles, as above indicated, through the perforations of the sieve 13 and the layer of water resting thereon. Preferably the sieve 13 is slightly arched as indicated in Fig. 3 of the drawings in order to expedite the circulation of the liquid and bring about a thorough mixing of the latter upon the sieve 13. The further sieve 14 which is arranged above the sieve 13 will form the upper limiting wall for the emulsion of gas and liquid positioned intermediate the two sieves 13 and 14. The composition as well as the temperature of the gas-mixture will be regulated by the composition and the temperatures of said layer of liquid. The so regulated gas-mixture passes through the sieve 14 to the contact 15 consisting, for instance, of one or more nets of platinum wire and will oxidize on said contact. The hood 16 with the valve 17 therein serves for discharging the gases of nitric oxide generated by the apparatus. The further auxiliary devices 18, 19, 20, 21, 22 and 23 serve for conveying the liquid to the sieve 13 and for the automatic regulation of the layer of gas and liquid positioned intermediate said sieves 13 and 14. The liquid to be conveyed to the sieve 13 flows through the pipe 18 and thereupon through the pipe 19 towards the center of the sieve. Special care may further be taken in order to evenly distribute said liquid over the sieve 13. An excess of liquid on the sieve 13 may flow off through the pipe or conduit 21 and the siphon 20 towards the outside. The siphon 20 may be rotated around the pipe 21 and according as to whether said siphon 20 will be more or less inclined towards the horizontal plane the level of the layer of gas and liquid may be adjusted in vertical direction or its average density may be regulated. The aperture 23 and the flexible pipe or conduit 22 serve to render the auxiliary devices independent from the pressure which prevails in the interior of the apparatus shown in Fig. 3. By means of the pipe 25 with the valve 24 therein steam may be introduced into the layer intermediate the sieves 13 and 14 for regulating the tension of said liquid according to demand. The steam, however, may also be introduced in front of the layer of liquid, for instance, in front of the sieve 12.

The process according to our invention is not limited to the application of a layer of a liquid formed merely by water. The layer of liquid provided above the sieve may also consist of another liquid producing a vapor which does not affect the process of combustion of the ammonia. Also a liquid may be used having an inherently low pressure with relation to the service conditions, or the pressure of the liquid may be rendered very small by properly cooling the same.

From the above description it will be apparent that the scope of application of our present process is extraordinarily large permitting it to be applied in connection with most different gas mixtures. In fact, with the device described ammonia mixtures of from 7–8% to 40 vol.% of ammonia and even more can be used. The oxygen concentration of the gas mixture varies correspondingly, and by addition of Linde-air (oxygen contents 50–70%) strongly enriched with oxygen or by the addition of pure oxygen it will also be possible to keep the mixture upon a sufficiently high concentration, it being preferable in this case to maintain the stoichiometric proportion between ammonia and oxygen. For instance, also a non-diluted mixture of 1 volume part of ammonia with from one to three volume parts of pure oxygen, for instance 1.7 volume parts of pure oxygen, may be treated according to our invention. It may further be remarked that our present process may advantageously also be combined with any of the known processes or devices which serve for cooling the apparatus. Our invention consequently also includes those processes in which the walls of the reaction space are simultaneously cooled or in which devices for preventing radiation or for cooling are provided at the nitric oxide side of the contact.

A particular advantage of our present process as regards the cooling of the contact in connection with a layer of liquid is the possibility of admixing steam which exerts an extraordinarily effective cooling action, this being due to the large heat capacity of steam. It has further been found that the admixture of the elementary hydrogen to the initial mixture will act favorably upon the reaction process, that is to say, the yield obtainable in this way may be raised as compared with the yield attained without an admixture of the kind stated.

It will be evident at once that our present process and the various modifications of the same will produce a particularly favorable effect in all those cases in which the reaction gas is conducted to the contact at some higher pressure. In case of combustion under pressure the amount of heat generated per unit of space will rise in accordance with the conversion, the same as the radiation heat. It will therefore be obvious that by means of the device herein described the most favorable contact temperature may be maintained with the greatest degree of certainty. In consequence thereof, the combustion of ammonia under a pressure higher than 1 atm. will render possible to condense nitric oxides under increased pressure into nitric acid immediately subsequent to the process which is carried out by the combustion element.

The possiblity of condensation of the nitric oxides by means of our new process and its modifications will yield a high-% acid, as well as a high-% nitrogen in the waste gases; said nitrogen containing only extraordinary slight amounts of nitrose gas that can be easily removed by employing a preliminary process of purification. Our invention also includes a modification of the process by which said nitrogen is utilized either for azotizing the carbids of the earth-alkalies, that is to say, for the manufacture of lime-nitrogen, or for carrying through the ammonia-synthesis after an appropriate admixture of hydrogen.

We claim:

1. The hereindescribed process of making a high-grade nitric acid or other nitrogen-oxygen compounds by catalytic oxidation of ammonia or the like in mixture with oxygen or oxygen-containing gas, said process consisting in inserting a layer of liquid in the path of the gas in proximity to the zone of the catalytic contact and passing the mixture of gas through said layer of liquid in the form of bubbles, said liquid being adapted to absorb heat from the contact.

2. The herein-described process of making a high-grade nitric acid or other nitrogen oxygen compounds by catalytic oxidation of ammonia or the like in mixture with oxygen or oxygen-containing gases, said process consisting in inserting a layer of liquid in the front of the contact zone, and passing the mixture of gas through said layer of liquid in the form of bubbles.

3. The herein-described process of making a high-grade nitric acid or other nitrogen-oxygen compounds by catalytic oxidation of ammonia or the like in mixture with oxygen or oxygen-containing gases, said process consisting in providing within the path of motion of the gas in front of the contact zone of a catalyzer a layer of liquid, and causing the mixture of gas to pass through said layer of liquid to the contact of the catalyzer in the form of bubbles and causing said liquid to absorb heat from said contact by way of radiation and to evaporate partly into said mixture, the level of said layer of liquid being positioned in close proximity to said contact to prevent a directed explosion as well as a wave of explosion arising in the narrow space intermediate said contact and said layer of liquid.

4. The herein-described process of making a high-grade nitric acid or other nitrogen-oxygen compounds by catalytic oxidation of ammonia or the like in mixture with an oxygen or oxygen-containing gas, said process consisting in providing within the path of motion of the gas a layer of liquid in proximity to the zone of the catalytic contact to absorb heat therefrom, and passing the gas mixture through said layer of liquid in the form of bubbles, said liquid containing a substance, such as a solution of ammonia, affecting pressure of the vapor generated from said liquid.

5. The herein-described process of making a high-grade nitric acid or oxygen-nitrogen compounds by catalytic oxidation of ammonia or the like, said process consisting in providing a layer of liquid within the path of motion of the gas through the catalyzer, passing the gas through said layer in the form of bubbles, causing said liquid to absorb heat from the contact of the catalyzer by radiation and to partly evaporate into the mixture of fresh gas, and regulating the temperature of said liquid and the tension of the vapor produced therefrom.

6. A process as specified by claim 1 in which to the initial mixture there is added elementary hydrogen.

7. A process as specified by claim 2 in which to the initial mixture there is added elementary hydrogen.

8. A process as specified by claim 1, in which the mixture of gas is kept under a pressure higher than atmospheric pressure.

9. A process as specified by claim 1, in which the gas which has not undergone reaction is again utilized in the process.

10. A process as specified by claim 2, in which the mixture of gas is kept under a pressure higher than atmospheric pressure.

11. A process as specified by claim 3, in which the mixture of gas is kept under a pressure higher than atmospheric pressure.

12. A process as specified by claim 4, in which the mixture of gas is kept under a pressure higher than atmospheric pressure.

13. A process as specified by claim 5, in which the temperature of the liquid and the tension of the vapor produced therefrom are regulated by introducing steam at a place in front of the contact zone into said liquid.

14. A process as specified by claim 5, in which the temperature of the liquid and the tension of the vapor produced therefrom are regulated by introducing steam into said liquid.

In testimony whereof we affix our signatures.

THOMAS FISCHER.
RUDOLF WENDLANDT.